(No Model.)

J. D. VANCE.
CAR COUPLING.

No. 307,603. Patented Nov. 4, 1884.

Attest
Joseph W. Sims
Chas Anderson

Inventor
John D. Vance
By John W. Hill

UNITED STATES PATENT OFFICE.

JOHN D. VANCE, OF CINCINNATI, OHIO, ASSIGNOR OF ONE-HALF TO JOHN J. LEBEAU, OF SAME PLACE.

CAR-COUPLING.

SPECIFICATION forming part of Letters Patent No. 307,603, dated November 4, 1884.

Application filed September 24, 1884. (No model.)

*To all whom it may concern:*

Be it known that I, JOHN D. VANCE, of Cincinnati, in the county of Hamilton and State of Ohio, have invented certain new and useful Improvements in Car-Couplings, of which the following is a specification.

My invention is in the nature of an improvement upon a certain car-coupling for which Letters Patent were granted me June 19, 1883; and it consists of certain novel improvements in said coupling, whereby it is rendered more efficient in practical operation.

Figure 1:
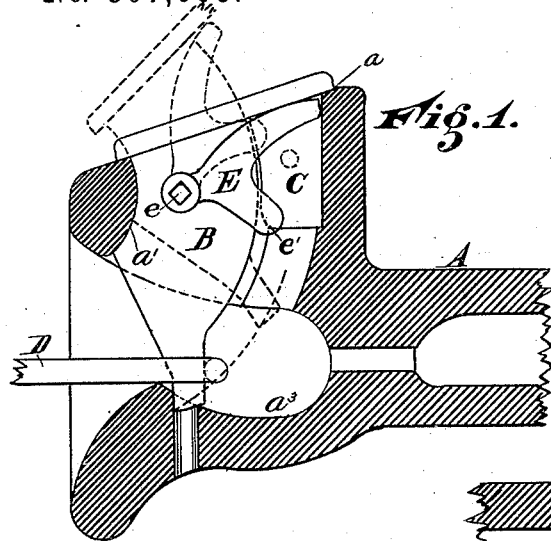
Figure 2:
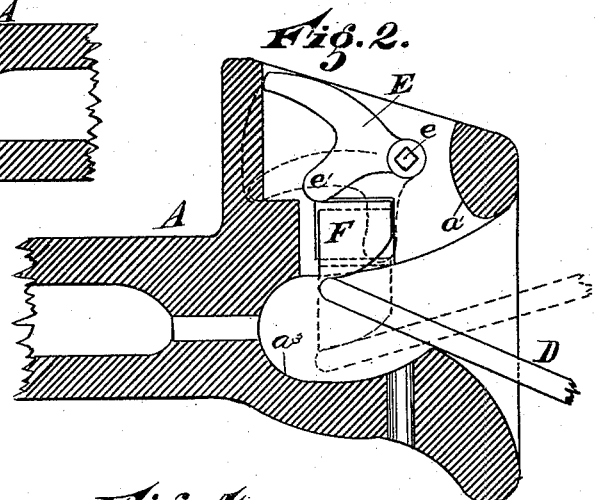
Figure 3:
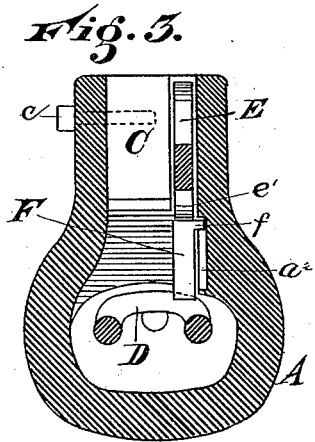
Figure 4:
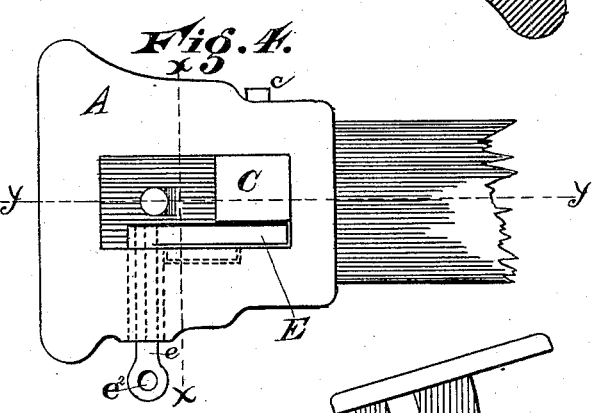
Figure 5:
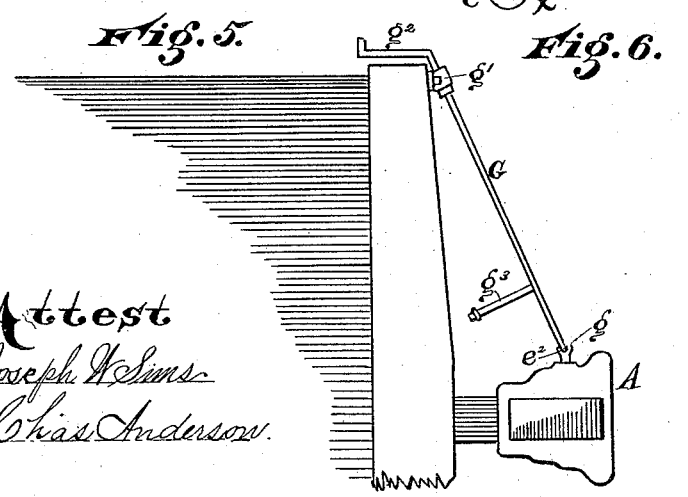

In the accompanying drawings, Figures 1 and 2 are longitudinal vertical sections on line $y\,y$ of plan; Fig. 3, a transverse vertical section on line $x\,x$ of Fig. 4. Fig. 4 is a plan view; Fig. 5, a portion of a railway-car in plan; and Fig. 6, an elevation of coupling-pin.

Similar letters of reference indicate similar parts.

Figure 6:
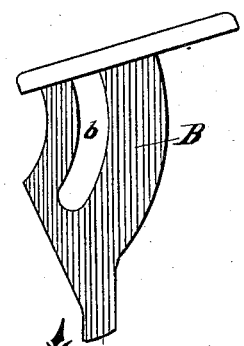

A is a draw-bar, usually of cast-iron; B, the coupling-pin, which may be solid, as shown in Fig. 1, or may be provided with the curved slot $b$, as shown in Fig. 6. If the pin is solid, as shown in Fig. 1, then the limiting-block C must be used to prevent the pin from jumping out of the draw-bar when the connection between two cars is made, the "ram" of the link usually being sufficient to throw the pin out of the draw-bar if some means are not provided to limit the upward motion of the pin. The block C fits the recess or opening $a$, Figs. 1 and 4, and is introduced after the pin B, and secured in position by the tap-bolt $c$. When the slotted pin B, Fig. 6, is used, the block C and bolt $c$ are not required, as will be shown hereinafter.

D is the coupling-link; E, an arm or lever mounted upon shaft $e$, (which turns in bearings in the forward end of draw-bar, as shown by dotted and full lines of Fig. 1,) raises the pin clear of the link when rolled forward.

The general operation of the pin B, link D, and arm E, so far as the latter is involved in raising the pin B, is the same as in my former patent, and need not be further explained herein. It will be observed, however, that the bearing $a'$ upon which the pin B turns is of smaller angle in the present coupling, and that less slack of link is required in coupling and uncoupling cars.

F is a block provided with an overhanging lip or flange, $f$, and loosely fitted to recess $a^2$, Figs. 2 and 3, in which recess said block has a vertical motion limited by the upper and under sides of recess and the flange $f$. A projection, $e'$, on the under side of arm E engages with upper surface of block F, (see Fig. 2,) and the lower surface of block F engages with the inner end of the link D in such a manner that when the shaft $e$ is rotated backward the projection $e'$ presses upon the loose block F and forces the link D downward at its inner end and upward at its outer end, as shown by dotted lines of Fig. 2. This feature permits the link to be varied in altitude to meet the requirements of draw-bars whose mouths or openings are higher or lower than draw-bar A. The shaft $e$ is provided with an eye, $e^2$, at its outer end, into which is connected the eye $g$ of shaft G, which shaft passes through bearing $g'$ attached to side or end of car, and is provided with a handle or arm, $g^2$, by means of which shaft G, and consequently shaft $e$, are operated from the outside of car and clear of the railway-tracks, frogs, &c., and as the rotation of shaft $e$ and arm E forward (or toward head of draw-bar) raises the coupling-pin B clear of the link D, and the rotation of shaft $e$ and arm E in the opposite direction forces block F and link D downward, it follows that the entire operation of coupling or uncoupling two cars may be accomplished without going between the cars. The flexible connection formed by eyes $e^2\,g$ furnishes a universal joint to shafts G and $e$ for the easy rotation thereof in either direction, and provides for the necessary longitudinal motion of the draw-bar in use. An arm, $g^3$, on shaft G, to which a chain or rope may be attached, permits the lifting of the pin B from the deck of the car. When the pin B, Fig. 6, is used, the shaft $e$ passes through the slot $b$ and prevents the pin from jumping out of the draw-bar.

By reference to Figs. 1 and 2 it will be observed that the draw-bar is cored out at $a^3$ to permit of a large vertical motion to the inner end of link D when the same is forced downward by the arm E and block F.

Having described my invention, what I claim is—

1. In combination with draw-bar A and link D, the arm E, provided with a projection, $e'$, and the movable block F, for the purpose and substantially as described.

2. In a car-coupling, the combination, with draw-bar A, coupling-pin B, link D, and arm E, of the flexibly-connected shafts $e$ and G, for the purpose and substantially as described.

In testimony whereof I have signed my name to the foregoing specification in the presence of two subscribing witnesses.

JOHN D. VANCE.

Witnesses:
JOHN J. LEBEAU,
CHAS. ANDERSON.